March 29, 1932. O. B. BOARTS 1,851,891
NECK GRIP AUTOMATIC MILK BOTTLE LOCK
Filed April 20, 1931 2 Sheets-Sheet 1
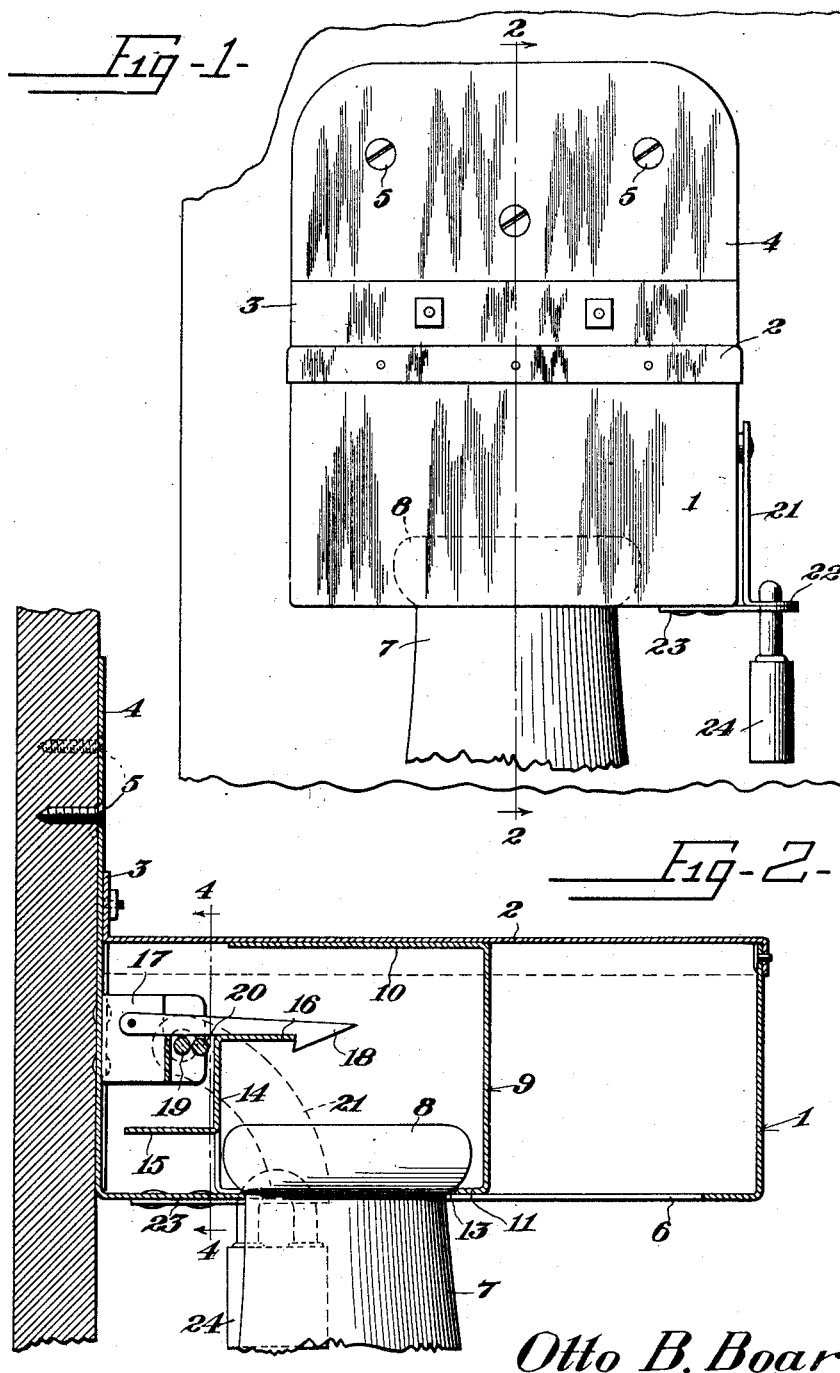
Otto B. Boarts
INVENTOR
BY Victor J. Evans
and Co.
ATTORNEYS

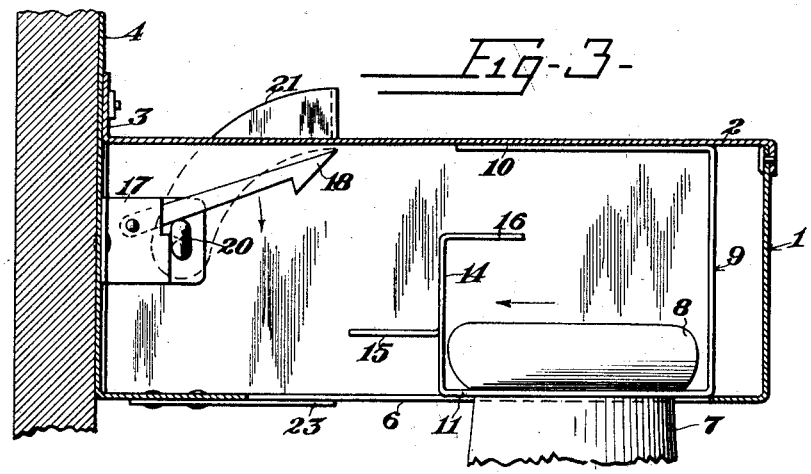
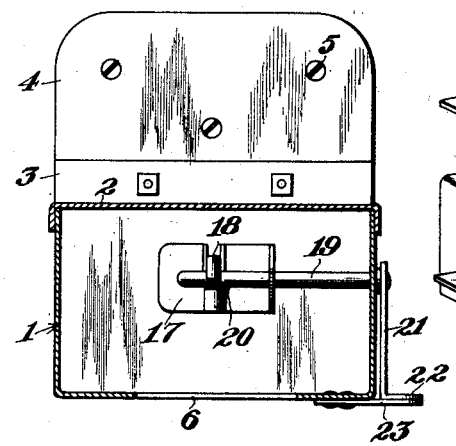
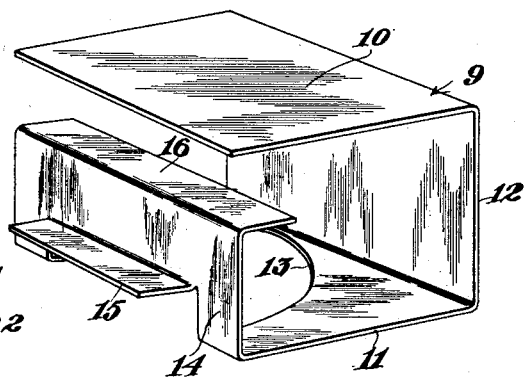
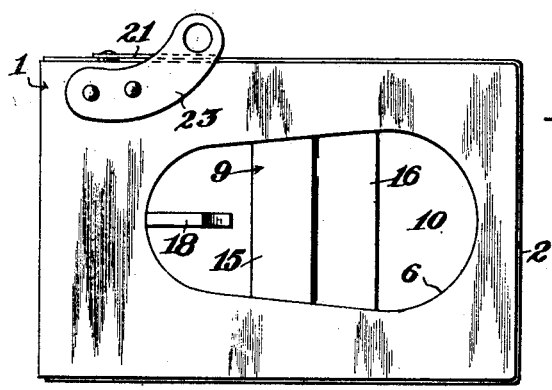

Patented Mar. 29, 1932

1,851,891

UNITED STATES PATENT OFFICE

OTTO B. BOARTS, OF IOWA CITY, IOWA

NECK GRIP AUTOMATIC MILK BOTTLE LOCK

Application filed April 20, 1931. Serial No. 531,517.

This invention relates to a neck grip automatic milk bottle lock and has for the primary object, the provision of a device of the above stated character which will efficiently secure the milk bottle against thieves and interference from children and which is so constructed that the application of the bottle thereto will only require the use of one hand of the deliveryman and will be as easily accomplished by the deliveryman as if placing the bottle on the floor as now customary.

Another object of this invention is the provision of an elevated casing having means for receiving and gripping the neck of a milk bottle when placed therein and which means may be locked to prevent an unauthorized removal of the bottle from the casing.

A further object of this invention is the provision of means whereby the bottle may be easily and quickly removed from the casing when unlocked by an authorized person, thus providing a device which is especially desirable both by housewives and deliverymen and will protect the neck and discharge end thereof from foreign matter.

A still further object of this invention is the provision of a neck grip automatic milk bottle lock of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a front elevation illustrating a neck grip automatic milk bottle lock constructed in accordance with my invention.

Figure 2 is a sectional view taken on the line 2—2 of Figure 1.

Figure 3 is a similar view illustrating the bottle neck inserted within the casing prior to being moved to a locked position.

Figure 4 is a sectional view taken on the line 4—4 of Figure 2.

Figure 5 is a perspective view illustrating the bottle engaging element.

Figure 6 is a bottom plan view illustrating the device.

Referring in detail to the drawings, the numeral 1 indicates an elongated casing closed by a cover 2 which is riveted or otherwise secured to the walls of the casing and has one end angularly disposed to form an attaching flange 3 and engages an extended end wall of the casing as clearly shown in Figure 3. The extended end wall of the casing projects a considerable distance beyond the flange 3 to provide a support attaching member 4 having a plurality of openings to receive screws or like fasteners 5 for securing the casing to a wall or support at any desired elevation. The flange 3 is bolted to the member 4.

The bottom wall 5 of the casing has formed therein a tapering slot 6, one end of which is of sufficient size to permit the passage of the neck 7 of a milk bottle into and out of the casing and when the milk bottle is moved toward the other or restricted end of the slot, the walls thereof engage under the bead 8 to suspend the bottle from the casing.

A neck receiving member 9 is mounted in the casing 1 for sliding movement and includes upper and lower plates 10 and 11 connected by an end plate 12. The lower wall 11 is provided with an opening or slot 13 of a size to permit the neck and bead of the bottle to extend through the plate and said plate is bent angularly in an upward direction to form a fastener engaging portion 14. The slot 13 besides being located in the wall 11 extends into the fastener engaging portion 14 by striking a portion of the material of said member 14 outwardly therefrom and which provides a flange 15. The upper part of the fastener engaging portion 14 is bent to provide a horizontal flange 16 underlying the upper plate 10 and arranged in spaced relation thereto.

A bracket 17 is located within the casing and has pivoted thereto a catch 18 adapted to engage over the flange 16 when the bottle receiving member 9 is moved with the bottle toward the restricted end of the slot 6 thus locking the bottle against a reverse movement and prevents the removal of the bottle from the casing until the catch 18 is disengaged from the flange 16. A shaft 19 is journalled in the casing and bracket 17 and is provided with an offset portion or crank 20 to engage under the catch 18 for elevating said catch on said pivot by the rotation of the shaft.

The outer end of the shaft carries a curved arm 21 having formed on its free end an apertured ear 22 adapted to be aligned with an aperture in a keeper 23 secured to the casing 1. With the apertured ear 22 aligning with the keeper 23, the shackle of a padlock 24 may be passed therethrough for the purpose of locking the arm against movement, consequently preventing the disengagement of the catch 18 from the flange 16 of the bottle receiving member 9.

In operation, the bottle neck is inserted within the casing and the bottle receiving member 9 with the bead 8 elevated to a position that it will engage the inner face of the portion 14 and the bottle is then moved toward the restricted end of the slot 6. The catch 18 is then lowered to engage the flange 16 by bringing the curved arm 21 downwardly to allow the apertured ear to be aligned with the aperture in the keeper 23 whereby the shackle of the padlock may be placed through the aligned apertures and lock the bottle against unauthorized removal from the casing.

Should it not be desired to lock the bottle to the casing, the bottle neck is first inserted through the large end of the slot 6 and the slot 13 of the member 9 and the bottle is then slid toward the registered end of the slot 6 with the bead 8 of the neck of the bottle passing through the slot in the portion 14 permitting the member 9 to remain stationary and with the bottle located in the restricted end of the slot 6 it will be supported to the casing but may be removed from the casing at any time desired without actuating the fastening means heretofore described.

While I have shown and described the preferred embodiment of my invention, it will be understood that minor changes in construction, combination and arrangement of parts may be made without departing from the spirit and scope of the invention, as claimed.

Having thus described my invention, what I claim is:

1. A device of the character set forth comprising a casing having a tapering slot to receive the neck of a bottle and permit said bottle to be moved laterally into the restricted end of the slot that the walls of said slot may support the bottle in a suspended position, and a bottle engaging member slidably mounted in the casing and receiving the neck of the bottle and moved laterally within the casing with the bottle, said member having means whereby the bottle may be moved laterally without moving the member, and a catch in the casing to engage said member to prevent a reverse sliding movement and withdrawal of the bottle from the casing.

2. A device of the character set forth comprising a casing having a tapering slot to receive the neck of a bottle and permit said bottle to be moved laterally into the restricted end of the slot that the walls of the slot may support the bottle in a suspended position, a bottle engaging member receiving the neck of the bottle and slidably mounted in said casing and adapted to be moved laterally within the casing by the movement of the bottle when said bottle is moved laterally and with the bead of the neck of the bottle elevated to engage a part of said member, said member having a slot to permit movement of the bottle without moving the member, and a catch engaging the bottle receiving member to prevent reverse movement and withdrawal of the bottle from the casing.

3. A device of the character set forth comprising a casing having a tapering slot to receive the neck of a bottle and permit said bottle to be moved laterally into the restricted end of the slot that the walls of the slot may support the bottle in a suspended position, a bottle engaging member receiving the neck of the bottle and secured in said casing and adapted to be moved laterally within the casing by the movement of the bottle when said bottle is moved laterally and with the bead of the neck of the bottle elevated to engage a part of said member, and a catch engaging the bottle receiving member to prevent reverse movement and withdrawal of the bottle from the casing, said member having a slot in one wall thereof to permit the bottle to be moved laterally into the restricted end of the first named slot when said bottle is not elevated sufficiently to bring the neck and bead thereof into engagement with a part of said member.

4. A device of the character set forth comprising a casing having a tapering slot to receive the neck of a bottle and permit said bottle to be moved laterally into the restricted end of the slot that the walls of said slot may support the bottle in a suspended position, a bottle engaging member slidable in the casing and receiving the neck of the bottle and movable with said bottle when the latter is in a certain position, said member having a slot to permit sliding movement of the bottle when in another position without sliding the member, a pivoted catch to engage the member to prevent a reverse movement and withdrawal of the bottle from the casing, means for disengaging the catch from said bottle engaging member, and a locking means for said first means.

5. A device of the character set forth comprising a casing having a tapering slot to receive the neck of a bottle and permit said bottle to be moved laterally into the restricted end of the slot that the walls of said slot may support the bottle in a suspended position, a bottle engaging member slidable in the casing and receiving the neck of the bottle and movable with said bottle when the latter is in a certain position, catch means carried by the casing to engage said member, a keeper carried by the casing, and a padlock to engage said keeper and said means.

6. A device of the character set forth comprising a casing having a tapering slot to receive the neck of a bottle and permit the bottle to be moved laterally into the restricted end of said slot that the walls of said slot may support the bottle in suspended position, upper and lower connected walls slidably engaging the upper and lower walls of the casing and said lower wall having a slot, a catch engaging element carried by the lower wall and having a slot aligning with the slot in the lower wall, said upper and lower walls adapted to be moved laterally within the casing by the bottle during the movement of the latter into the restricted end of the first named slot, a pivoted catch in the casing to engage said catch engaging member, and an operating means for the catch.

In testimony whereof I affix my signature.

OTTO B. BOARTS.